(12) United States Patent
Ogle et al.

(10) Patent No.: US 8,797,379 B2
(45) Date of Patent: Aug. 5, 2014

(54) MULTIPOINT CONFERENCE SCALABILITIY FOR CO-LOCATED PARTICIPANTS

(75) Inventors: David M. Ogle, Cary, NC (US); Bryan D. Osenbach, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 13/483,201

(22) Filed: May 30, 2012

(65) Prior Publication Data

US 2012/0236110 A1 Sep. 20, 2012

Related U.S. Application Data

(63) Continuation of application No. 12/953,556, filed on Nov. 24, 2010, now Pat. No. 8,416,281.

(51) Int. Cl.
*H04N 7/14* (2006.01)

(52) U.S. Cl.
CPC ..................... *H04N 7/14* (2013.01)
USPC ............... 348/14.08; 348/14.09; 348/14.12

(58) Field of Classification Search
CPC ......... H04N 7/15; H04N 7/152; H04N 7/14; H04N 7/141; H04N 7/142; H04N 7/147; H04N 7/148; H04L 12/1827; H04M 3/42348; H04M 3/567; H04M 2203/2094
USPC ................... 348/14.01–14.16; 370/260–261; 709/204

See application file for complete search history.

(56) References Cited

U.S. PATENT DOCUMENTS

| | | | |
|---|---|---|---|
| 5,835,129 A | 11/1998 | Kumar | |
| 5,896,128 A | 4/1999 | Boyer | |
| 6,952,471 B1 | 10/2005 | Cannon | |
| 7,136,398 B1 | 11/2006 | Huart et al. | |
| 7,325,033 B2 | 1/2008 | Thornton | |
| 2003/0129956 A1 | 7/2003 | Virolainen | |
| 2003/0174826 A1 | 9/2003 | Hesse | |
| 2005/0007445 A1 | 1/2005 | Foote et al. | |
| 2008/0273078 A1 | 11/2008 | Grasley et al. | |
| 2009/0033737 A1 | 2/2009 | Goose et al. | |
| 2009/0096860 A1 | 4/2009 | Barreiro | |
| 2009/0157799 A1 * | 6/2009 | Sukumaran et al. | 709/203 |
| 2010/0198992 A1 | 8/2010 | Morrison et al. | |
| 2011/0040836 A1 * | 2/2011 | Allen et al. | 709/205 |

FOREIGN PATENT DOCUMENTS

| | | | |
|---|---|---|---|
| EP | 1868362 A1 | 12/2007 | |
| EP | 1973320 A1 | 9/2008 | |

* cited by examiner

*Primary Examiner* — Melur Ramakrishnaiah
(74) *Attorney, Agent, or Firm* — Patents on Demand P.A.; Brian K. Buchheit; Scott M. Garrett

(57) ABSTRACT

A terminal device associated with a participant of the multipoint session can be identified. The multipoint session can be associated with a video and an audio stream. The terminal device can be a computing device comprising of an audio and video input, and a video output. The multipoint session can be a conference associated with a telephony session. The location of the terminal device and a conferencing device can be determined. The conferencing device can be associated with an audio input and output. If the terminal device is proximate to the conferencing device, a terminal device audio stream can be terminated and a conference device audio stream can be received. A video stream and an audio stream can be simultaneously presented upon the audio and video output of the conferencing device and terminal device. The video and the audio stream can be a synchronized stream of the session.

8 Claims, 3 Drawing Sheets

MULTIPOINT CONFERENCE SCALABILITY FOR CO-LOCATED PARTICIPANTS

CROSS-REFERENCE TO RELATED APPLICATION

This application is a continuation of U.S. patent application Ser. No. 12/953,556, filed Nov. 24, 2011 (pending), which is incorporated herein in its entirety.

BACKGROUND

The present invention relates to the field of and multipoint conferencing, more particularly, to improving multipoint conference scalability for co-located participants.

Multipoint conferencing, an invaluable collaboration tool, enables multiple remote persons to participate in a collaboration session. Typically multipoint conferencing takes the form of videoconferencing, which includes a visual component and audio component. The visual component often includes a camera for capturing video and a display for presenting the captured video. The audio component typically includes a microphone to record audio (e.g., speech) and a speaker to play the recorded audio. Many times, a multipoint controller unit (MCU) is utilized to allow multiple persons in one location (e.g., boardroom) to communicate using one centralized terminal device (e.g., conference phone).

BRIEF SUMMARY

One aspect of the present invention can include a method, a computer program product, a system, and an apparatus for enhancing multipoint conferencing. In this aspect, a terminal device associated with a participant of the multipoint session can be identified. The multipoint session can be associated with a video and an audio stream. The terminal device can be a computing device comprising of an audio and video input, and a video output. The multipoint session can be a conference associated with a telephony session. The location of the terminal device and a conferencing device can be determined. The conferencing device can be associated with an audio input and output. If the terminal device is proximate to the conferencing device, a terminal device audio stream can be terminated and a conference device audio stream can be received. A video stream and an audio stream can be simultaneously presented upon the audio and video output of the conferencing device and terminal device. The video and the audio stream can be a synchronized stream of the session.

Another aspect of the present invention can include a system for enhancing multipoint conferencing comprising a presence engine, a bridge manager, and a mapping structure. The presence engine can determine the location of a terminal device associated with a multipoint session. The terminal device can be associated with an audio stream and a video stream. The multipoint session can be a conference associated with a telephony session. The bridge manager can add and remove a conferencing device from the session, where the conferencing device is associated with an audio stream. The mapping structure can link a conferencing device with at least one of a unique identifier and a location.

DETAILED DESCRIPTION

Figure 1:
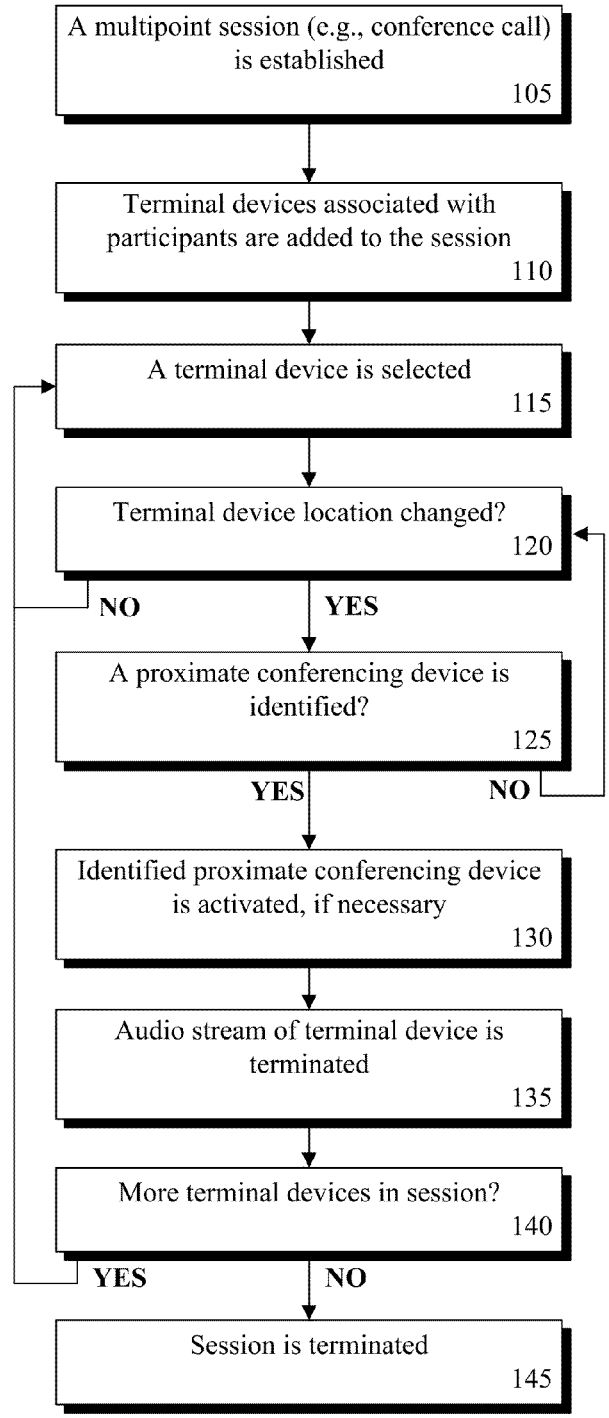
FIG. 1 is a flowchart illustrating a method for improving multipoint conferencing scalability for co-located participants in accordance with an embodiment of the inventive arrangements disclosed herein.

If a person is utilizing a personal device (e.g., laptop) to participate in a multipoint conference session within the same location (e.g., co-located) as the terminal device, problems can arise. One common problem is the degradation of audio quality from audio feedback. For example, audio output from one person's laptop speaker can feed into another person's laptop microphone and cause feedback or echo for all users participating in the conference. As such, the person must either terminate the use of the personal device or change location. In many instances, these solutions can be detrimental to the session and do not leverage existing infrastructure to allow flexible session configurations to exist.

The present disclosure is a solution for improving multipoint conference scalability for co-located participants. In the solution, a multipoint session can utilize a centralized conferencing device to merge audio channels for each terminal device (e.g. laptop) which is proximate to the conferencing device. That is, a proximate conferencing device (e.g., conference phone) can be used to convey audio while the terminal device can be used to convey video. As such, the disclosure can reduce the total audio channels for the session, improving scalability and reducing resource utilization. In one embodiment, the solution can be a component of a Voice over Internet Protocol architecture.

In one embodiment, the solution can be utilized with a session which implements video switching capabilities (e.g., active speaker presentation). In the embodiment, audio received from a proximate conferencing device can be analyzed to determine an active speaker utilizing proprietary and/or traditional audio stream selection.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a flowchart diagram illustrating a method 100 for improving multipoint conferencing scalability for co-located participants in accordance with an embodiment of the inventive arrangements disclosed herein. In method 100, a conferencing device (e.g., conference phone) can be utilized to reduce the quantity of audio streams of a multipoint session for co-located devices. As used herein, co-located can refer to the presence of a terminal device (e.g., laptop) within proximity of a conferencing device (e.g., conference phone) associated with a multipoint session. Multipoint session can be a semi-permanent interactive information exchange between three or more communicating devices. For example, the multipoint session can be a conference call between four participants, each utilizing a laptop to interact with each other. The multipoint session can include an audio component, a video component, and the like. The multipoint session can be a telephone conference, a videoconference, a Web conference, and the like.

As used herein multipoint session can be associated with Voice over Internet Protocol (VoIP) technologies. VoIP can be one or more methodologies for enacting communications and multimedia sessions over Internet Protocol. VoIP can include, but is not limited to, communication protocols, transmission technologies, and the like. Protocols can include, but is not limited to, Session Initiated Protocol, H.323, IP Multimedia Subsystem (IMS), Real-time Transport Protocol (RTP), and Session Description Protocol (SDP).

In one instance, the conferencing device can be a telephony device able to convey audio during a multipoint session. In the instance, an audio stream from the telephony device can be utilized simultaneously with video from the terminal device.

In step 105, a multipoint session can be established. The session can be initiated by a participant interacting with an application such as a videoconferencing application executing on a terminal device. In step 110, terminal devices associated with participants can be added to the session. The terminal devices can be identified based one or more unique identifiers. Unique identifiers can include, but is not limited to, telephone number, Internet Protocol (IP) address, Media Access Control (MAC) address, and the like. For instance, a contact list linking participants to a terminal device can be maintained enabling rapid management of participants and/or terminal devices. In one instance, terminal devices can be introduced into the session via a participant list associated with a client (e.g., terminal device) and/or an invitee list associated with a server (e.g., server 230).

In step 115, a terminal device can be selected. The terminal device can be selected based on one or more criteria, including, but not limited to, device identifier, participant information, and the like. In step 120, if the terminal device location is different from a historic location (e.g., during call initiation), the method can proceed to step 125, else return to step 115. The location of the terminal device can be determined utilizing one or more location-based technologies, including, but not limited to, Global Positioning System (GPS), Assisted GPS (A-GPS), BLUETOOTH, Radio Frequency Identification (RFID), and the like. In one instance, terminal device location can be obtained through polling the device for a current location. In another instance, terminal device location can be conveyed by the terminal device upon determination of location change.

In step 125, if a proximate conferencing device is identified, the method can proceed to step 130, else return to step 120. Step 120, 125 can be repeated until a proximate conferencing device (e.g., conference phone) is identified. The proximity of the terminal device to a conferencing device can be determined based on one or more configurable settings. In one instance, the proximity of the terminal device to the conferencing device can be determined based on a physical distance. In the instance, one or more threshold values can be utilized to establish proximity. For instance, a conferencing device can be in proximity if the terminal device is less than four feet away. In one embodiment, traditional proxemics values (e.g., personal distance, social distance) can be utilized to determine threshold.

In step 130, the identified proximate conferencing device can be activated if the conferencing device is not in use. Activation can include one or more actions permitting the inclusion of the conferencing device to the multipoint session. In one instance, the conferencing device identifier (e.g., alias, phone number) can be automatically determined based on the terminal device location. In the instance, the conferencing device identifier can be used to automatically associate the conferencing device to the multipoint session. For instance, a mapping can be utilized to determine the phone number of the identified proximate conferencing device which can be used to dial the conferencing device into the session. In another instance, the conferencing device can be manually activated and joined to the multipoint session via one or more participant actions.

In step 135, the audio stream associated with the terminal device can be terminated. That is, video for a participant can be captured from the terminal device and audio for the participant can be recorded from the conferencing device. In one instance, multipoint session can support video switching which can be visually indicating a participant of interest (e.g., active speaker). In the instance, video switching can be maintained while simultaneously using terminal device for video input and conferencing device for audio input.

In step 140, if there are more terminal devices associated with the session, the method can return to step 115, else continue to step 145. Step 115-140 can be continuously performed during the multipoint session, permitting dynamic resource allocation during the session. In step 145, the session can be terminated and the method can end.

Drawings presented herein are for illustrative purposes only and should not be construed to limit the invention in any regard. It should be appreciated that method 100 can be performed in real-time or near real-time during a multipoint session. It should be appreciated that steps 115-140 can be performed at any time during a multipoint session. In one instance, steps 115-140 can be performed at commencement of the session. In another instance, steps 115-140 can be responsive to a device joining the session after the session has commenced.

Figure 2:
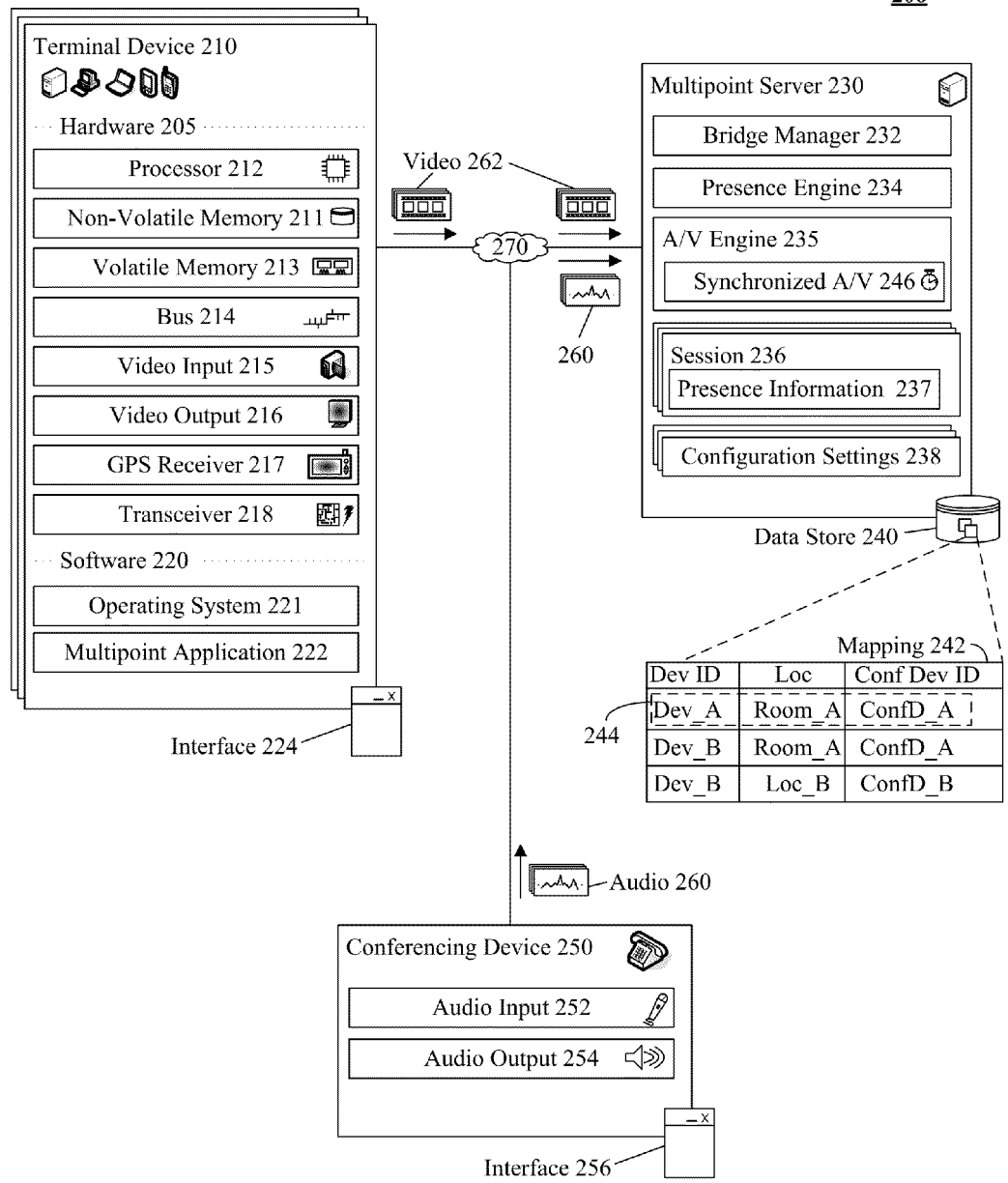
FIG. 2 is a schematic diagram illustrating a system for improving multipoint session scalability for co-located participants in accordance with an embodiment of the inventive arrangements disclosed herein.

FIG. 2 is a schematic diagram illustrating a system 200 for improving multipoint session scalability for co-located participants in accordance with an embodiment of the inventive arrangements disclosed herein. System 200 can be present in the context of method 100. In system 200, terminal device 210 can be used concurrently with conferencing device 250 to permit multipoint session scalability to be achieved. System 200 components can be communicatively linked via network 270. In one embodiment, system 200 can conform to a conventional Voice over Internet Protocol (VOIP) capable system.

As used herein, session 236 can be a multipoint session associated with computing device 210, 230, 250. It should be appreciated that computing device 210 can include multiple computing devices operated by participants (e.g., human agents) of the session 236. For instance, four participants can utilize personal laptops (e.g., video) and a conference phone (e.g., audio) while occupying a conference room during a multipoint session. Session 236 can include, but is not limited to, session information 237, session history, session configuration, and the like.

Video 262 can be a digitally encoded artifact of input received from component video input 215. Video 262 characteristics can include, but is not limited to, frames per second, interlacing, resolution, aspect ratio, color space, compression, bit rate, and the like. Video 262 can conform to one or more traditional and/or proprietary encoding formats, including, but not limited to, H.264, Motion Picture Expert Group 4 (MPEG-4), H.261, H.263, and the like.

Audio 260 can be a digitally encoded artifact of input received from component audio input 252. Audio 260 characteristics can include, but is not limited to, sample rate, dynamic range, compression, and the like. Audio 260 can conform to one or more traditional and/or proprietary formats including, but not limited to, MPEG-4, Adaptive Multi-Rate (AMR), Advanced Audio Coding (AAC), Enhanced Variable Rate CODEC (EVRC), 3GPP, and the like. In one embodiment, audio 260 can be received, encoded, and communicated to multipoint server 230 in real-time or near real-time.

Conferencing device 250 can be hardware/software component associated with multipoint session permitting recording and presenting of audio. Device 250 can include, but is not limited to, audio input 252, audio output 254, interface 256, digital signal processor (DSP), memory, and the like. Device 250 can include, but is not limited to, a VoIP telephone, telepresence system, and the like. In the instance, device 250 can be a hardware phone, software phone, and any combination thereof. In another instance, device 250 can be a videophone with conferencing capabilities. In yet another instance, device 250 can be a component of a videoconferencing system. It should be appreciated device 250 can include video components (e.g., camera, display) which can be selectively disabled.

Audio input 252 can be one or more hardware/software components able to receive sound (e.g., voice). Input 252 can include, but is not limited to, dynamic microphone, piezoelectric microphone, and the like. Audio input 252 can receive audio input from proximate participants which can be conveyed to server 230 as audio 260. In one instance, audio 260 can be processed prior to transmission. Processing can include, but is not limited to, noise cancellation, encryption, and the like.

Audio output 254 can be one or more hardware/software components able to present sound. Audio output 254 can be an output device such as a loudspeaker. Audio output 254 can convey audio (not shown) received from multipoint server 230 associated with session 236.

Interface 256 can be a hardware/software component for interacting with conferencing device 250. Interface 256 can include, but is not limited to, input components, output components and the like. Input components can include, but is not limited to, keyboard, keypad (e.g., dialpad), and the like. Output components can include, but is not limited to, loudspeakers, display, and the like. In one embodiment, interface 256 can be utilized to manually join device 250 to a multipoint session 236. In the embodiment, device 250 can be utilized for audio input and device 210 can be used for video input simultaneously.

Multipoint server 230 can be a hardware/software component for bridging video and audio associated with session

236. Multipoint server 230 can include, but is not limited to, bridge manager 232, presence engine 234, A/V engine 235, session 236, configuration settings 238, data store 240, and the like. In one instance, multipoint server can be a component of a H.323 gatekeeper. In another instance, multipoint server can be a component of a multipoint control unit (MCU). In one instance, server 230 can be a network element within a local area network (LAN) and/or wide area network (WAN). In one embodiment, multipoint server 230 can be a component of IBM LOTUS UNIFIED COMMUNICATIONS AND COLLABORATION (UCC) software. It should be appreciated that components 232-240 can be optional components.

Bridge manager 232 can be a hardware/software component for managing session 236 control. Manager 232 functionality can include, but is not limited to, initiating session 236, terminating session 236, manipulating device 210 session interaction, handling device 250 session interaction, address translation, protocol conversion, call management, authentication, encryption, and the like. In one instance, manager 232 can automatically dial conferencing device 250 address and associate the device 250 with session 236. In the instance, manager 232 can signal terminal device 210 to terminate audio input and trigger conferencing device 250 to initiate receiving audio input.

Presence engine 234 can be a hardware/software entity for tracking device 210 location. Presence engine 234 can monitor presence information 237 for each participant associated with device 210. Engine 234 can be configured to respond to one or more participant states and/or locations. In one embodiment, engine 234 can trigger device 210 to terminate receiving of audio input from a participant if in proximity of device 250 and initiate collection of audio input if not in proximity of audio device 250. In one instance, presence engine 234 can be an external resource (e.g., presence server).

Presence information 237 can be one or more datasets associated with terminal device 210 of session 236. Presence information 237 can include, but is not limited to, location, user state, and the like. Location can include, but is not limited to, a geographic location, coordinates (e.g., Cartesian coordinates), a zone, and the like. Presence information 237 can be automatically populated by presence engine 234. Information 237 can be used to determine if a terminal device is proximate to a conferencing device 260. For instance, information 237 can be evaluated against known locations of conferencing devices to determine if a participant is close to a conference phone.

A/V engine 235 can be a hardware/software component for synchronizing audio 260 with video 262. Engine 235 can utilize conventional and/or proprietary synchronization mechanisms, including, but not limited to, time-stamping, relative time-stamping, and the like. In one embodiment, engine 235 can create synchronized A/V 246 which can be conveyed to devices 210, 260. In the embodiment, synchronized A/V 246 can be conveyed in real-time to appropriate devices 210, 260. In one instance, engine 235 can utilize audio synchronizer functionality to enable audio-to-video synchronization (e.g., lip synchronization) to be achieved. Engine 235 can operate in real-time or near real-time permitting system 200 functionality to be transparent. Engine 235 can use one or more traditional and/or proprietary mechanisms for alleviating latency, jitter, and other synchronization problems associated with network connectivity.

In one embodiment, engine 235 can be utilized to determine an active speaker from an audio 260 stream. In the embodiment, engine 235 can employ one or more intelligent algorithms to determine a best choice active speaker for the audio 260 stream. Algorithms can perform audio analysis (e.g., speech processing) including, but not limited to, amplitude analysis, utterance duration, and the like.

Synchronized A/V 246 can be a dataset of synchronized audio and video generated by engine 235. Synchronized A/V 246 can include, but is not limited to, an audio stream, a video stream, presence information, metadata, and the like. In one instance, A/V 246 can be individually communicated to appropriate devices 210, 260. In the instance, the video stream of A/V 246 can be conveyed to device 210 and the audio stream of A/V 246 can be communicated to conferencing device 260 simultaneously. That is, audio and video output is synchronized resulting in a solution similar to traditional multipoint sessions.

Configuration settings 238 can be one or more options for manipulating the behavior of server 230. Configuration settings 238 can include, but is not limited to user configuration settings, system settings, and the like. Settings 238 can include, but is not limited to, session configuration, dial plans, call policies, Quality of Service (QoS) policies, alias information, and the like.

Data store 240 can be a tangible storage medium for persisting mapping 242. Data store 240 can include, but is not limited to, Relational Database Management System (RDMBS), Object Oriented Database Management System (OODBMS), and the like. Data store 240 can be a component of a Network Attached Storage (NAS), Storage Attached Network (SAN), and the like.

Mapping 242 can be a dataset permitting linking of terminal device and conference device within session 236. Mapping 242 can include, but is not limited to, terminal device identifier, terminal device location, terminal device properties, participant information, session information, conference device identifier, conference device location, conference device properties, and the like. Mapping 242 can be used to associate terminal device to a conference device to enable simultaneous use of terminal device (e.g., video) and conference device (e.g., audio). For example, mapping entry 244 can associate a tablet computer (e.g., Dev_A) with a conference phone (e.g., ConfD_A) to enable simultaneous use of tablet and phone resources. Mapping 242 can be automatically and/or manually established. In one instance, mapping 242 can be continually updated in real-time to enable rapid adaptation to changes in terminal device 210 location.

Terminal device 210 can be a computing device associated with a multipoint session. Terminal device 210 can be, but is not limited to, a desktop computer, a laptop computer, a tablet computing device, a mobile phone, a personal digital assistant (PDA), Voice over Internet Protocol (VoIP) capable device, and the like. Device 210 can include, but is not limited to, hardware 211, software 220, and interface 224. Hardware 205 can include, but is not limited to processor 212, non-volatile memory 211, volatile memory 213, bus 214, video input 215, video output 216, GPS receiver 217, transceiver 218, and the like. Software 220 can include, but is not limited to, operating system 221, multipoint application 222, and the like. In one embodiment, terminal device 210 can be a laptop computer executing a multipoint application 222. It should be appreciated that terminal device 210 can include audio input/output components, but have been selectively omitted for clarity.

Processor 212 can be a portion of a computing system able to execute instructions of a computing program (e.g., application 222). Processor 212 can include, but is not limited to, central processing unit (CPU), microprocessor, graphics processing unit (GPU), and the like. Processor 212 can be utilized to process input from A/V input 215 and output from A/V output 216. Processing can include, but is not limited to, noise cancellation, buffering, and the like.

Non-volatile memory 211 can be a static storage medium for persisting session data (e.g., configuration settings) associated with session 236. Memory 211 can include, but is not limited to, flash memory, hard disk drive, and the like.

Volatile memory 213 can be a dynamic storage medium for temporarily persisting session data (e.g., video input) associated with session 236. Memory 213 can include, but is not limited to, random access memory (RAM), dynamic RAM (DRAM), static RAM (SRAM), and the like.

Bus 214 can be an interconnected subsystem for communicatively linking components 212-218. Bus 214 can be serial and/or parallel permitting high speed communications to and from components 212-218. In one instance, bus 214 can communicate data from components 215,216 to components 212-214, 218.

Video input 215 can be a hardware component for receiving video input from a participant. Video input 215 can be a component such as a charge-coupled device (CCD). In one embodiment, data from video input 215 can be received, encoded, and communicated in real-time or near real-time. In the embodiment, received input can be encoded via processor 212 and communicated using transceiver 218 in real-time to server 230 as video 262.

Video output 216 can be a hardware component for presenting a video portion of synchronized A/V 246 associated with session 236. Output 216 can receive A/V 246 from multipoint-server and present the video portion within output 216. For example, video of a participant can be presented within an application 222 interface (e.g., interface 224) upon output 216. Output 216 can include, but is not limited to, computer display, display of a specialized communication device, and the like. Output 216 can conform to traditional and/or proprietary technologies including, but not limited to, Liquid Crystal Display (LCD), Organic Light Emitting Diode (LED), and the like.

GPS receiver 217 can be a device able to receive GPS data based on an automatically determined the location or a user specified location. GPS data can include, but is not limited to, mapping data, GPS coordinate data, and the like. In one instance, GPS receiver 217 can be an external device communicatively linked to device 210.

Transceiver 218 can be a component permitting communication between components 230, 250. Transceiver 218 can be a computer networking transceiver, Radio Frequency (RF) transceiver, and the like.

Application 222 can be a software entity permitting communication of audio (not shown) and video 262 to multipoint server 230. Application 222 can be responsive to device 210 location based on one or more customizable configurations. In one instance, device 210 can automatically terminate/activate an audio input associated with device 210 if proximity of device 250 changes. In one embodiment, termination/activation of audio can be based on utterances. In one configuration of the embodiment, application 222 can determine pauses in an audio stream received by an audio input component (e.g., microphone) and intelligently activate/terminate audio input. In the instance, an interface notification can be presented, alerting a participant that the audio stream of a proximate device 250 can be utilized. In one instance, application 222 can be IBM SAMETIME software.

Network 270 can be a hardware/software component for permitting communication between components 210, 230, 250. Network 270 can include, but is not limited to, wired technologies, wireless technologies, and any combination thereof. Wired technologies can include, but is not limited to, twisted pair, coaxial cable, optical fiber, and the like. Wireless technologies can include, but is not limited to, cellular systems, Personal Communication Service (PCS) system, wireless local area network (WLAN) terrestrial microwave, and the like. Network 270 can utilize communication protocols including, but not limited to, Real-time Transport Protocol (RTP), RTP Control Protocol (RTCP), User Datagram Protocol, Internet Protocol, H.323, Session Initiated Protocol, and the like.

Drawings presented herein are for illustrative purposes only and should not be construed to limit the invention in any regard. System 200 can be a component of a distributed network, distributed computing environment, cloud computing environment, and the like. It should be appreciated that system 200 functionality can be implemented within an existing multipoint architecture. It should be noted that system 200 communication can be bi-directional and/or real-time. Further, system 200 can enable interaction with third party software and/or multipoint conferencing units which can lack video switching functionality.

In one instance, server 230 can automatically detect resource capacity limits and notify relevant participants through an interface notice presented upon device 210 (e.g., interface 224). In the instance, the notice can present a participant with a suggested proximate conferencing device 250. For example, if server 230 resources are limited, one or more participants can be notified that a conference phone associated with session 236 is proximate.

Figure 3:
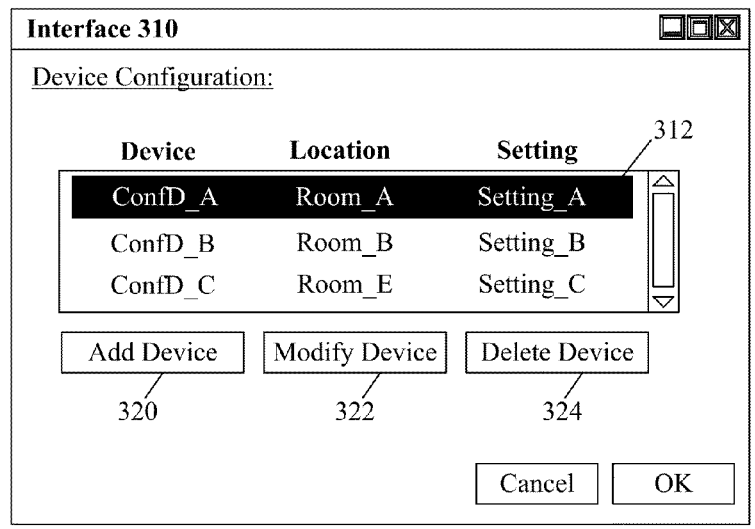
FIG. 3 is a schematic diagram illustrating a set of interfaces for improving multipoint session scalability for co-located participants in accordance with an embodiment of the inventive arrangements disclosed herein.
Figure 3:
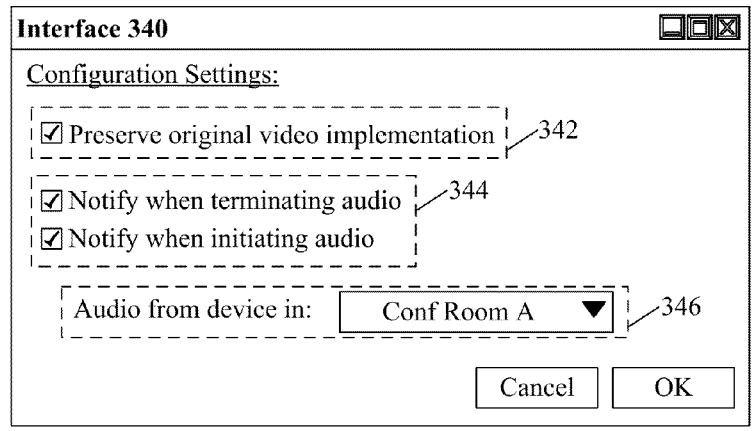

FIG. 3 is a schematic diagram illustrating a set of interfaces 310, 340 for improving multipoint session scalability for co-located participants in accordance with an embodiment of the inventive arrangements disclosed herein. Interface 310, 340 can be present in the context of method 100 and system 200. Interface 310, 340 can be a screen associated with a configuration window. Interface 310, 340 can be associated with client-side settings, server-side settings and the like. In one instance, interface 310, 340 can be presented within interface 224. In another instance, interface 310, 340 can be presented within an interface (not shown) associated with server 230. In one instance, interface 310, 340 can be associated with one or more zones within a network configuration.

In interface 310, conferencing device configuration can be established and/or manipulated. Manipulation can include, but is not limited to, adding a conferencing device, modifying a conference device configuration, deleting a conference device, and the like. In one instance, interface 310 can be a server-side setting associated with server 230. In the instance, interface 310 can permit modification of mapping 242.

In section 312, available conference devices registered with system 200 can be presented. In the section 312, conference device selection can be performed. Selection of a conference device can permit actions 322-324 to be initiated.

Element 320 can permit the automated and/or manual addition of a conferencing device. In one instance, element 320 can present a pop-up dialog enabling conferencing device details to be inputted. In another instance, element 320 can present a pop-up dialog presenting a series of automatically detected conferencing devices. If a conferencing device is added, the device can be registered with system 200 and presented within section 312.

Element 322 can allow modification of registered conferencing devices through device selection in section 312. Element 222 can enable dynamic conferencing device setting adjustments to be performed. In one instance, element 222 can present a pop-up dialog showing current conferencing device settings. In the instance, user input can be received to change conferencing device settings. For instance, if a conferencing device identity changes, element 322 can be utilized to manually update the setting to reflect the change.

Element 324 can permit de-registration of conferencing devices from system 200. Element 324 can remove selected conferencing device in section 312 from being presented. In one instance, conferencing device settings can be removed if element 324 is selected. In another instance, conferencing device settings can be automatically persisted. For example, element 324 can be utilized to remove conferencing devices which have been removed and/or replaced due to device failure.

In interface 340, terminal device configuration settings can be established and/or manipulated. In interface 340, settings 342-346 can be utilized if a terminal device joins and/or leaves the proximity of a conference device. Settings 342-346 can be dynamically applied enabling flexible real-time configuration options. It should be appreciated that, interface 340 is not limited to terminal device settings and can include, session settings, conference device settings, and the like.

Setting 342 can enable the preservation of video mechanics if utilizing a proximate conferencing device. If setting 342 is enabled, system 230 can automatically detect the appropriate video implementation in use for session 236. In one instance, if video switching, such as an "active speaker" functionality, is utilized within a session, video switching can be maintained utilizing setting 342.

Setting 344 can permit user (e.g., participant) notification if audio inputs are changed due to proximity with a conferencing device. Setting 344 can include one or more options to notify a user if audio input is terminated and/or initiated on a terminal device. For instance, an audible sound (e.g., beep) can be presented if a user moves out of proximity of a conferencing device and audio input is initiated on the terminal device.

Setting 346 can present one or more proximate conferencing devices which can be available based on terminal device proximity. In one instance, setting 346 can permit manual selection of proximate conferencing devices. In another instance, setting 346 can allow automated selection of a conferencing device to be presented. For instance, setting 346 can present an alias (e.g., Conf. Room A) of proximate conferencing devices, enabling a participant to easily identify the conferencing device.

Drawings presented herein are for illustrative purposes only and should not be construed to limit the invention in any regard. Interface 310, 340 can be a graphical user interface, text based user interface, voice user interface, mixed-mode interface, and the like. Functionality expressed within interface 310, 340 can be present within file menus, context menus, menu bars, toolbars, and the like. Interface 310, 340 can include one or more graphical user interface elements including, but not limited to, checkboxes, radio dialogs, combo boxes, and the like. Interface 310, 340 can receive input and/or selection via traditional and/or proprietary mechanisms, including, keyboard, mouse, gesture, and the like.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
   identifying a terminal device associated with a participant of the multipoint session, wherein the multipoint session is associated with a video stream and an audio stream, wherein the terminal device is a computing device comprising of an audio input, video input, and a video output, wherein the multipoint session is a conference associated with a telephony session;
   determining the location of the terminal device and a conferencing device, wherein the conferencing device is associated with an audio input and an audio output; and
   terminating an audio stream associated with the audio input of terminal device and receiving an audio stream from the audio input of a conference device if the terminal device is proximate to the conferencing device; and
   simultaneously presenting a video stream upon the video output of the terminal device and an audio stream upon the audio output of the conferencing device, wherein the video stream and the audio stream is synchronized, wherein the video stream and audio stream is associated with the session.

2. The method of claim 1, further comprising:
   automatically presenting at least one proposed conferencing device proximate to the location of at least one terminal device.

3. The method of claim 2, wherein the proposed proximate conferencing device is automatically associated with the multipoint session.

4. The method of claim 1, wherein the session is associated with a video switching capability, wherein the video switching capability visually indicates a video stream associated with a participant of interest, wherein the video switching capability is maintained in response to an audio stream associated the audio input of the terminal device is terminated.

5. The method of claim 4, wherein the synchronization is a lip synchronization.

6. The method of claim 1, wherein the telephony session conforms to a Voice over Internet Protocol session.

7. The method of claim 1, further comprising:
   receiving an audio stream from the audio input and a video stream from the video input of the terminal device if the terminal device is not proximate to the conferencing device; and
   presenting a video stream within the video output and an audio stream within the audio output of the terminal device.

8. The method of claim 1, wherein the conferencing device is at least one of a telephony device, videotelephony device, and a telepresence system.

* * * * *